United States Patent

Shibamiya

[11] Patent Number: 5,499,381
[45] Date of Patent: Mar. 12, 1996

[54] ELECTRONIC APPARATUS WITH INTERCHANGEABLE PERIPHERAL DEVICE AND A PROCESSOR INTERRUPT FEATURE

[75] Inventor: Yoshikazu Shibamiya, Tokyo, Japan

[73] Assignee: Canon Kabushiki Kaisha, Tokyo, Japan

[21] Appl. No.: 344,622

[22] Filed: Nov. 17, 1994

Related U.S. Application Data

[63] Continuation of Ser. No. 62,153, May 17, 1993, abandoned, which is a continuation of Ser. No. 383,275, Jul. 19, 1989, abandoned, which is a continuation of Ser. No. 99,615, Sep. 22, 1987, abandoned.

[30] Foreign Application Priority Data

Sep. 25, 1986 [JP] Japan .................... 61-227805

[51] Int. Cl.⁶ .................................. G06F 13/00
[52] U.S. Cl. .................. 395/800; 395/280; 364/232.8; 364/264; 364/269.2; 364/DIG. 1
[58] Field of Search ................... 395/800, 575, 395/500, 425, 325, 275, 725; 371/8.1, 10.1, 11.1, 9.1, 11.3, 21.1; 364/184–187

[56] References Cited

U.S. PATENT DOCUMENTS

| | | | |
|---|---|---|---|
| 3,581,285 | 5/1971 | Neema et al. | 364/900 |
| 3,585,599 | 6/1971 | Hitt et al. | 364/200 |
| 3,728,693 | 4/1973 | Macker et al. | 364/200 |
| 3,913,719 | 10/1975 | Frey | 346/75 |
| 3,967,246 | 6/1979 | House | 340/172.5 |
| 4,004,277 | 1/1977 | Gavril | 340/172.5 |
| 4,124,891 | 11/1978 | Weller, III et al. | 364/200 |
| 4,181,940 | 1/1980 | Underwood | 364/200 |
| 4,349,873 | 9/1982 | Gunter et al. | 364/200 |
| 4,429,362 | 1/1984 | Costantini | 364/200 |
| 4,456,808 | 6/1984 | Wilkinson et al. | 219/98 |
| 4,502,116 | 2/1985 | Fowler | 364/200 |
| 4,598,356 | 7/1986 | Dean et al. | 395/575 |
| 4,688,170 | 8/1987 | Waite et al. | 364/200 |
| 4,688,172 | 8/1987 | Wright | 364/200 |
| 4,779,189 | 10/1988 | Legvold | 364/200 |
| 4,835,737 | 5/1989 | Herrig et al. | 395/325 |
| 4,837,712 | 6/1989 | Shibamiya | 364/523 |
| 4,924,391 | 5/1990 | Hirano et al. | 364/424.03 |
| 5,125,088 | 6/1992 | Culley | 395/500 |
| 5,171,092 | 12/1992 | Tasaki | 400/121 |

FOREIGN PATENT DOCUMENTS

| | | |
|---|---|---|
| 58-144842 | 11/1983 | Japan . |
| 59-146354 | 12/1984 | Japan . |
| 58181365 | 8/1985 | Japan . |
| 6085668 | 3/1987 | Japan . |

*Primary Examiner*—Alyssa H. Bowler
*Assistant Examiner*—Alpesh M. Shah
*Attorney, Agent, or Firm*—Fitzpatrick, Cella, Harper & Scinto

[57] ABSTRACT

An electronic apparatus with an interchangeable peripheral device, in which, when the interchangeable peripheral device is changed, a corresponding signal is sent to a microprocessor to shift it to a halt state, which is released by the termination of the signal, thereby preventing the erroneous operation of the microprocessor.

4 Claims, 4 Drawing Sheets

| Fig. 3A | Fig. 3B |

| | LID STATE | CPU OPERATION | DOOR SWITCH CONDITION | S4 (TERMINALS A, B) LEVEL |
|---|---|---|---|---|
| 1 | LID IS CLOSED | TYPEWRITER NORMAL OPERATION | OFF | 1 |
| 2 | OPEN LID | CPU IS INTERRUPTED TO JUMP TO CGROM CHANGE ROUTINE | ⌐_ (falling edge) | 1 → 0 |
| 3 | LID IS OPEN | INTERRUPTION FUNCTION IS INHIBITED | ON | 0 |
| 4 | LID IS OPEN | HALT PREPROCESS | ON | 0 |
| 5 | LID IS OPEN | TIMER ROUTINE FOR ELIMINATING CHATTERING | ON | 0 |
| 6 | LID IS OPEN | HALT FUNCTION IS ENABLED | ON | 0 |
| 7 | CHANGE CGROM | CPU IS IN HALT STATE | ON | 0 |
| 8 | CLOSE LID | CANCEL HALT HALT FUNCTION IS INHIBITED | _⌐ (rising edge) | 0 → 1 |
| 9 | LID IS CLOSED | HALT POST-PROCESS | 1 | 1 |
| 10 | LID IS CLOSED | TIMER ROUTINE FOR ELIMINATING CHATTERING | 1 | 1 |
| 11 | LID IS CLOSED | INTERRUPTION FUNCTION IS ENABLED AGAIN | 1 | 1 |
| 12 | LID IS CLOSED | RETURN FROM INTERRUPTION ROUTINE TO NORMAL ROUTINE IT RETURNS TO "1" | 1 | 1 |

Fig.3B

| INTERRUPTION FUNCTION | INPUT PORT A | HALT FUNCTION | INPUT PORT B |
|---|---|---|---|
| ○ | × | × | ○ |
| ○ | × | × | ○ |
| × | ○ | × | ○ |
| × | ○ | × | ○ |
| × | ○ | × | ○ |
| × | ○ | × | ○ |
| × | ○ | ○ | × |
| × | ○ | × | ○ |
| × | ○ | × | ○ |
| × | ○ | × | ○ |
| ○ | × | × | ○ |
| ○ | × | × | ○ |

ELECTRONIC APPARATUS WITH
INTERCHANGEABLE PERIPHERAL DEVICE
AND A PROCESSOR INTERRUPT FEATURE

This application is a continuation of application Ser. No. 08/062,153, filed May 17, 1993, now abandoned, which is a continuation of application Ser. No. 07/383,275, filed Jul. 19, 1989, now abandoned, which is a continuation of application Ser. No. 07/099,615, filed Sep. 22, 1987, now abandoned.

BACKGROUND OF THE INVENTION

1. Field of the Invention

The present invention relates to an electronic apparatus, and, more particularly to an apparatus equipped with a microprocessor having a halt function and an interruption function, and an interchangeable peripheral device connectable with the microprocessor through a connector or the like.

2. Related Background Art

In the conventional apparatus of this kind, the interchange of a peripheral device connected to the microprocessor (hereinafter called CPU) during the function thereof induces runaway or erroneous operations of the CPU. For this reason such interchange is generally effected after the power supply is cut off. If the power supply is not cut off, the interchange may be effected while the CPU does not make access to the peripheral device to be interchanged. However, in order to prevent erroneous operations of the CPU caused by the contact noises of the connector or the like at the interchange, a buffer circuit is inserted between the bus line of the CPU and the peripheral device. Thus, the connector and the bus line are electrically insulated by the buffer circuit before the peripheral device is mechanically removed from the connector, and the insulation is removed after the interchange. However, the former method is inconvenient as the power supply has to be cut off at each interchange, while the latter method is associated with an increased cost due to the presence of the buffer circuit.

SUMMARY OF THE INVENTION

An object of the present invention is to provide an electronic apparatus having a peripheral device connectable to a processor through a bus line, in which the function of the processor is interrupted when the peripheral device is detached from the bus line.

Another object of the present invention is to provide an electronic apparatus involving an interchangeable peripheral device, comprising a processor (hereinafter called a CPU ) having a halt function; an interchangeable peripheral device connected through a connector to the bus line of the CPU; device interchange signal generating means for generating, at the interchange of the device, a signal indicating that the interchange of the device is in progress; and device interchange signal detecting means for causing the CPU to detect the signal; wherein the CPU is shifted to a halt state in response to the detection of the device interchange signal by the CPU at the interchange of the device, and the halt state is cancelled at the termination of the signal.

The foregoing and still other objects of the present invention, and the advantages thereof, will become fully apparent from the following description of the embodiments of the present invention.

BRIEF DESCRIPTION OF THE DRAWINGS

FIG. 3 is a chart showing the function of the present invention.

DETAILED DESCRIPTION OF THE PREFERRED EMBODIMENTS

Figure 1:
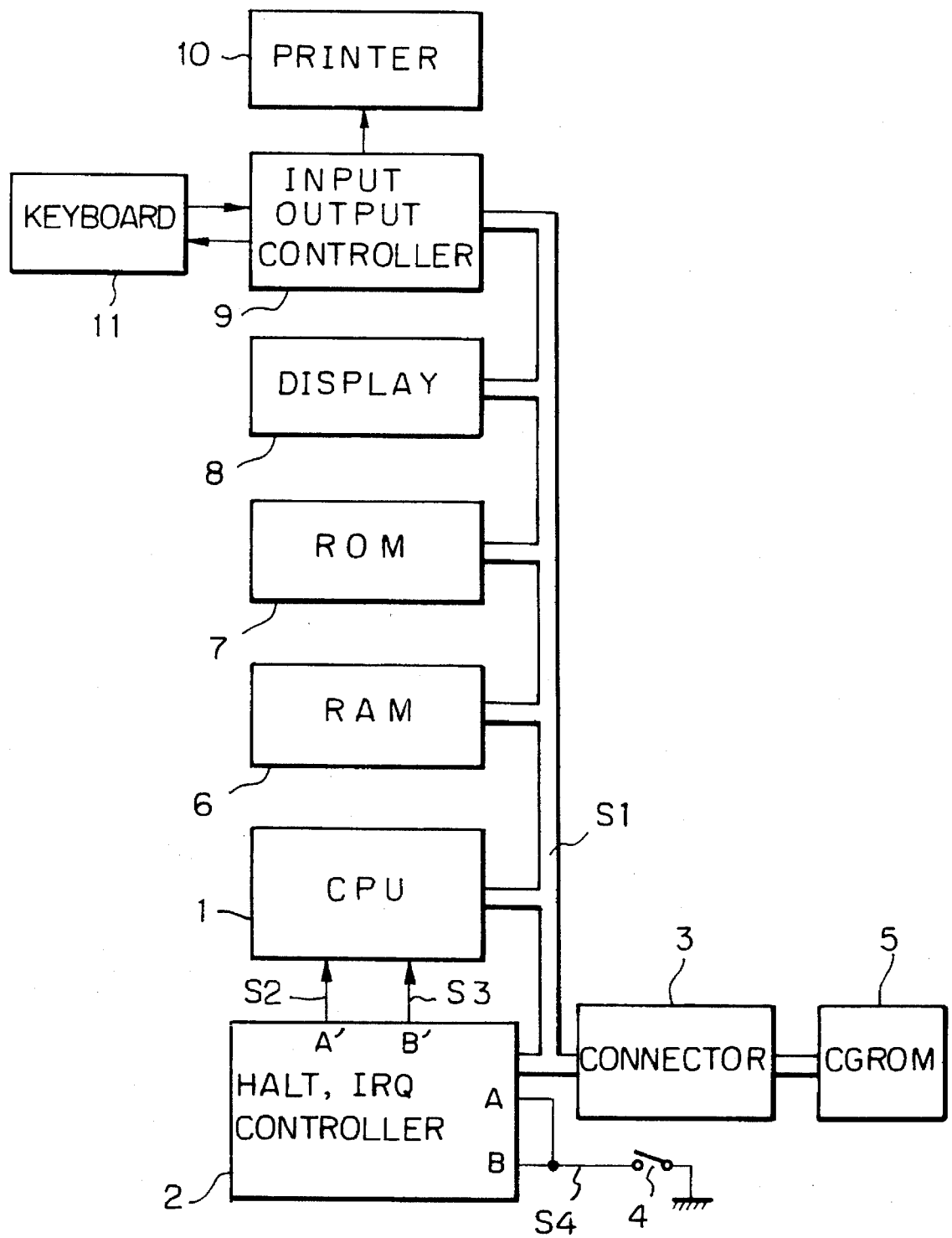
FIG. 1 is a block diagram of an embodiment of the present invention.

Now the present invention will be clarified in detail by an embodiment thereof consisting of an electronic typewriter equipped with a dot printer. FIG. 1 is a block diagram of the embodiment.

A microprocessor 1 (hereinafter called a CPU) reads program instructions from a ROM to be explained later, executes processes necessary for typewriting and controls a keyboard, a printer, a display unit etc. The CPU is provided with an interruption port (IRQ port) and executes an interruption process when the port is activated. Also the CPU is capable of a halt function and has a halt port which is normally maintained at a logic "L" level. When the port is shifted to the "H" level, the CPU does not read a next instruction after the completion of an instruction currently in execution, and enters a halt state in which the function is temporarily suspended. When the port is shifted to the L-level again, it restarts the reading and execution of the instructions.

A HALT/IRQ controller 2 is used for the control at the interchange of a peripheral device (CGROM 5 to be explained later) of the typewriter.

A connector 3 is used for connecting the CGOM 5 to be explained later with a bus line and a control line of the CPU 1.

A door switch 4 is used for generating a signal indicating that the interchange of the CGROM 5 is in progress.

A character generator ROM (CGROM) 5 interchangeably connected to the connector 4 is prepared in different fonts and enables typewriting in different styles when interchanged.

A RAM 6 is used for temporarily storing results of calculation and various data during the execution of instructions of the CPU 1.

A read-only memory (ROM) 7 stores a program for the CPU 1.

A display unit 8 displays data entered from a keyboard to be explained later, and information necessary for typewriting.

An input/output controller 9 is used for transmitting the signal from the keyboard to the CPU 1 or transmitting the control output signals to a printer to be explained later.

A printer 10 is used for printing the dot patterns read by the CPU from the CGROM 5 according to the key data entered from the keyboard.

A keyboard 11 constitutes input means for entering various data for printing or editing texts.

A bus line S1 is provided for data transfer and control of various parts to be executed by the CPU 1.

A control line S2 is used for controlling the halt function, to be explained later, of the CPU 1.

A control line S3 is used for controlling the interruption function, to be explained later, of the CPU 1.

Figure 2:
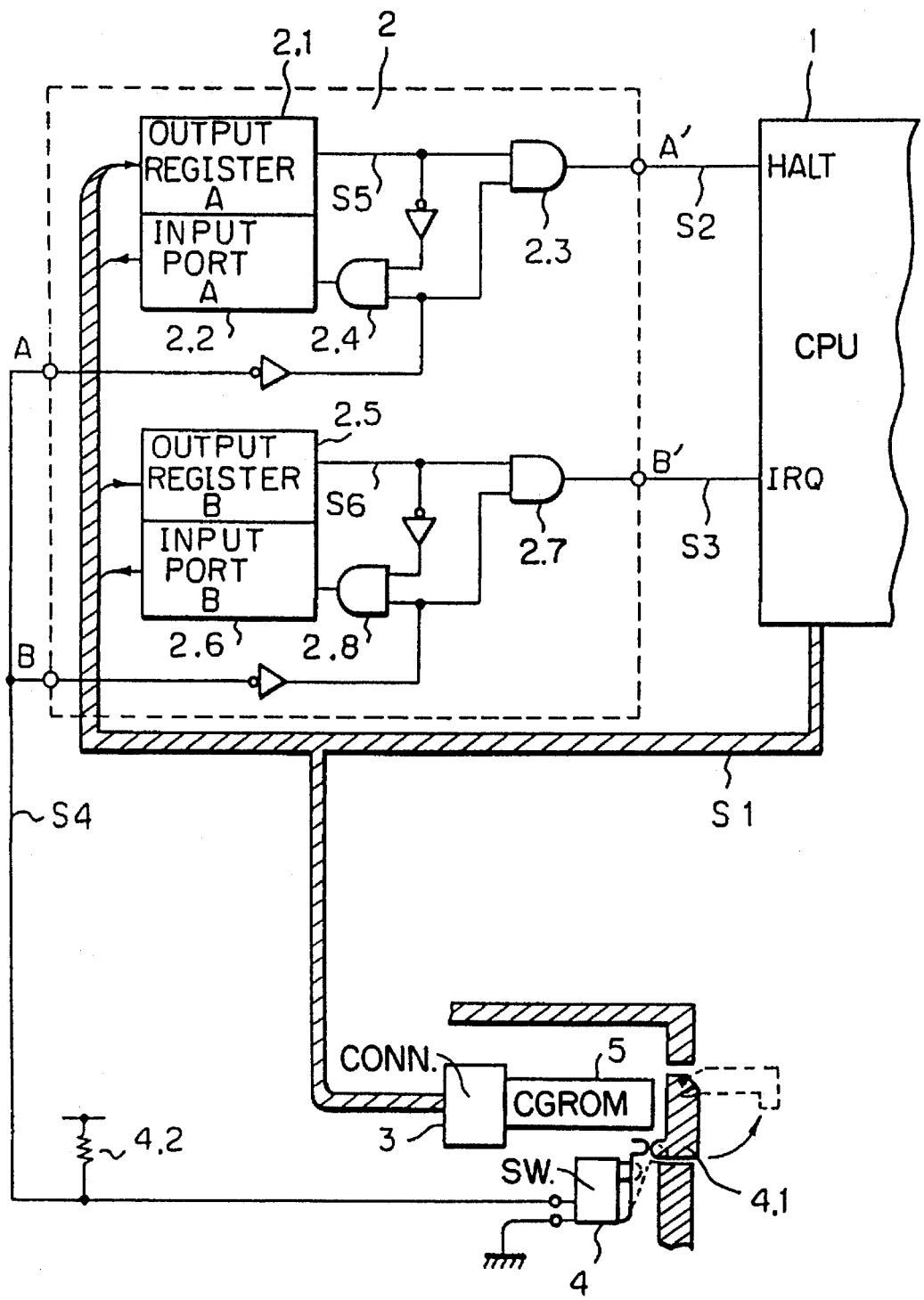
FIG. 2 is a detailed view of a part directly related to the present invention in FIG. 1.

FIG. 2 is a detailed view of a part of the present embodiment directly related to the present invention.

Output registers 2.1, 2.5 respectively supply signal lines S5, S6 with signals for controlling halt and interruption enable ports of the CPU 1.

The halt function or the interruption function of the CPU is enabled through an AND gate 2.3 or 2.7 when the output of the output register is in a logic level "1" and the signal line S4 (device interchange signal ) is at the logic level "1".

An input port 2.2 or 2.6 is enabled when the output of the output register 2.1 or 2.5 is at the logic level "0" whereby the CPU can detect the logic level of the signal line S4.

A cover (lid) 4.1, a pull-up resistor 4.2 and a door switch 4 which is closed or opened respectively when the cover is opened or closed, constitute a mechanism for generating the device interchange signal.

Now there will be given an explanation of the function of the present invention, while making reference to FIGS. 1 and 2.

In the normal function of the present system as a typewriter, the CPU detects the key information from the keyboard 11 through the input/output controller 9, and accordingly executes the display on the display unit, or temporary storage in the RAM, or reading of dot patterns from the CGROM 5 and supply thereof to the printer 10. Different fonts such as courier, Italic and pica can be obtained by changing the CGROM 5.

In the above-explained function of the present system as a typewriter, the output register A 2.1 is set at "0" while the output register B 2.5 is set at "1" so that the signal line S2 is at a level "0" even when the signal line S4 is at a level "0", whereby the halt function of the CPU 1 is inhibited while the interruption function is enabled. Also the input port A 2.2 is enabled while the input port B 2.6 is inhibited. Furthermore, in the normal operation with the cover closed, the door switch 4 is opened whereby the logic level of the device interchange signal on the line S4 is maintained at "1" by the pull-up resistor 4.2 to maintain the interruption control line S3 at "0" even when the signal line S6 is at "1". Therefore the interruption procedure is not started.

FIG. 3 shows the procedure of interchanging the CGROM 5 for varying the typewriting font. As the cover 4.1 is opened for the interchange, the door switch 4 is closed to shift the line S4 to the logic level "0" and the line S3 to the level "1" thereby requesting an interruption procedure of the CPU 1. Thus, the CPU 1 jumps to an interruption routine (CGROM interchange routine). At first, in order to prevent multiple interruptions caused by the chattering of the door switch, the output register B 2.5 is shifted from "1" to "0". Then the CPU executes a pre-halt process, such as the lifting of the printing head or the stopping of the driving motor if a printing operation is in progress, or the protection of the input text if a text entry is in progress. Then the CPU passes a timer routine of a predetermined period to terminate the chattering of the door switch 4, then it confirms that the signal line S4 is at a logic level "0" and shifts the output register A 2.1 from "0" to "1" thereby enabling the halt function of the CPU. Since the signal line S4 is already at the logic level "0", the CPU 1 immediately enters the halt state through the AND gate 2.3 and the signal line S2. The CGROM 5 is interchanged in such halt state of the CPU 1. The time required from the closing of the door switch 4 to the start of the halt state of the CPU 1 is shorter than the period from the completion of the opening of the cover 4.1 to the moment when the CGROM 5 is touched by the operator. After the interchange of the CGROM 5, the cover 4.1 is closed to open the door switch 4 whereby the signal line is shifted from the logic level "0" to "1". Thus the signal line S2 is shifted from the logic level "1" to "0" to terminate the halt state of the CPU 1. In order to prevent the repeated halt state by the chattering of the door switch 4, the CPU 1 shifts the output register A 2.1 from "1" to "0", thereby inhibiting the halt function, and executes a post-halt process for returning to the typewriting function. Then the CPU passes a timer routine for terminating the chattering of the door switch 4, then confirms through the input port A 2.2 that the signal line S4 is at the logic level "1", and shifts the register B 2.5 from "0" to "1" thereby enabling the interruption function and terminating the interruption routine. In this state the interruption is not started again since the signal line S4 is at the level "1". The interchange of the CGROM 5 is thus completed, and the normal typewriting operation is restored.

In the foregoing explanation, the present invention has been explained by an embodiment in which the electronic apparatus is an electronic typewriter equipped with a dot printer, and the peripheral device to be interchanged is a CGROM, but the present invention is applicable to any combination of an electronic apparatus having a CPU and an interchangeable peripheral device controlled or operated by the bus lines of the CPU, such as a combination of a Japanese word processor and a CGROM, a dictionary ROM or a text RAM, or a combination of a personal computer and a language ROM, a game ROM or a sub-CPU.

A port A in FIG. 2 may be regarded as an input port instead of the halt port by switching the output register A 2.1 and a port B may be used as an input port instead of the interruption function. Therefore there may be employed, instead of the CPU 1 in FIG. 2, a CPU in which halt and interruption controls are combined.

As explained in the foregoing, it has been rendered possible to interchange the CGROM of a typewriter without interrupting the power supply and without the use of a buffer circuit, through suitable use of the interruption function and the halt function of the CPU.

I claim:

1. An electronic apparatus provided with an interchangeable peripheral device detachably connected to a CPU, comprising:

a bus line connected to said CPU, said peripheral device being detachably connected to said bus line;

means for detecting a connection of said peripheral device to said bus line before said peripheral device comes into contact with a connector of said CPU;

means for generating a detection signal of said detecting means;

means coupled to said CPU for outputting a halt control signal;

means coupled to said CPU for outputting an interruption control signal;

means for controlling said means for outputting a halt control signal in such a manner that when said CPU is in normal operation, said control means inhibits said output means from outputting the halt control signal, when a halt preprocess is completed and the generation of said detection signal is confirmed, said control means enables said output means to output the halt control signal, and after completion of the halt preprocess, said control means inhibits said output means from outputting the halt control signal; and means for controlling said means for outputting the interruption control signal in such a manner that when said CPU is in normal operation, said control means enables said output means to output the interruption control signal, when said detection signal is generated and the halt preprocess is executed, said control means inhibits said output means from outputting the interruption control signal, and further after it is confirmed that the detection signal is not generated, said control means enables said output means to output the interruption control signal.

2. An electronic apparatus according to Claim 1, wherein said peripheral device is a memory device.

3. An electronic apparatus according to Claim 1, wherein said generating means includes a detector switch.

4. An electronic apparatus according to Claim 2, wherein said memory device is a character pattern memory.

* * * * *

UNITED STATES PATENT AND TRADEMARK OFFICE
CERTIFICATE OF CORRECTION

PATENT NO.   :   5,499,381
DATED        :   March 12, 1996
INVENTOR(S)  :   Yoshikazu SHIBAMIYA It is certified that error appears in the above-indentified patent and that said Letters Patent is hereby corrected as shown below:

On the title page:

ITEM [56] - References Cited - U.S. PATENT DOCUMENTS:

"3,967,246 6/1979 House" should read --3,967,246 6/1976 House--.

ITEM [56] - References Cited - FOREIGN PATENT DOCUMENTS:

"58-144842 11/1983 Japan" should read --58-144842 8/1983 Japan--.

Signed and Sealed this

Twenty-third Day of July, 1996

Attest:

BRUCE LEHMAN

*Attesting Officer*             *Commissioner of Patents and Trademarks*